May 16, 1933.  R. L. ANDERSON  1,909,563

ANTIFRICTION STEERING MECHANISM

Filed Sept. 27, 1930  2 Sheets-Sheet 1

INVENTOR.
RALPH L. ANDERSON.
BY W. C. Johnstone
ATTORNEY

WITNESS
Walter Ackman

May 16, 1933.  R. L. ANDERSON  1,909,563
ANTIFRICTION STEERING MECHANISM
Filed Sept. 27, 1930  2 Sheets-Sheet 2
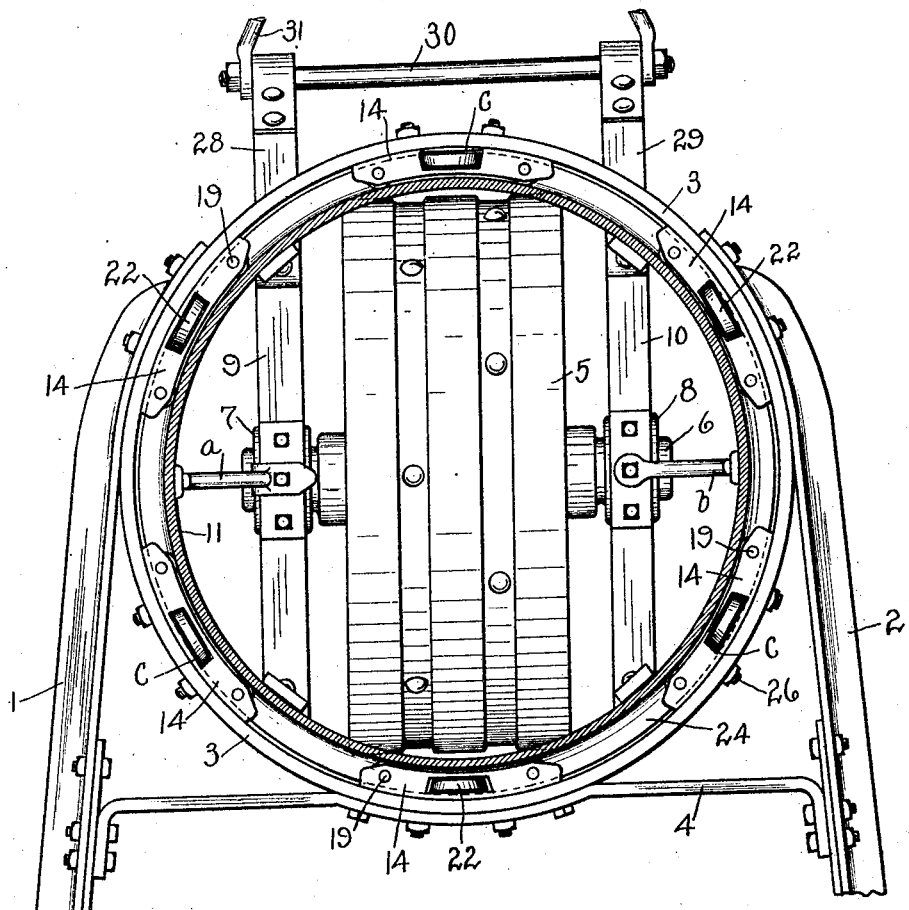
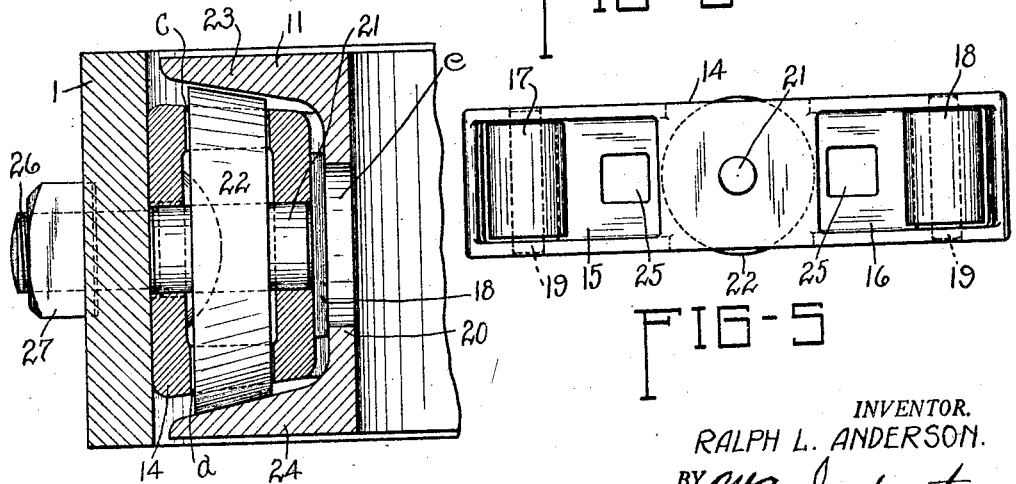
INVENTOR.
RALPH L. ANDERSON.
BY *W.C. Johnston*
ATTORNEY Patented May 16, 1933

1,909,563

UNITED STATES PATENT OFFICE

RALPH L. ANDERSON, OF MOLINE, ILLINOIS, ASSIGNOR TO DEERE & COMPANY, OF MOLINE, ILLINOIS, A CORPORATION OF ILLINOIS

ANTIFRICTION STEERING MECHANISM

Application filed September 27, 1930. Serial No. 484,829.

My invention relates to the fore part of an agricultural machine, particularly of that class in which steering is accomplished by guidance of the front wheel or wheels of the machine, and includes anti-friction means to offset possible wear and to provide a simple and effective device by the use of which steering is easily accomplished.

An object of my invention is to provide for the parts stated an anti-friction unit of a compact and simple construction which can be readily placed and secured in position, utilizing as many as may be necessary or desired.

Referring to the drawings in which similar numerals indicate identical parts—

Figure 2 is a plan view of Figure 1, partly in section and illustrating the application of my device;

Figure 4 is an enlarged section on the line 4—4 of Figure 1; and,

Figure 5 is a face view of an anti-friction unit.

Figure 1:
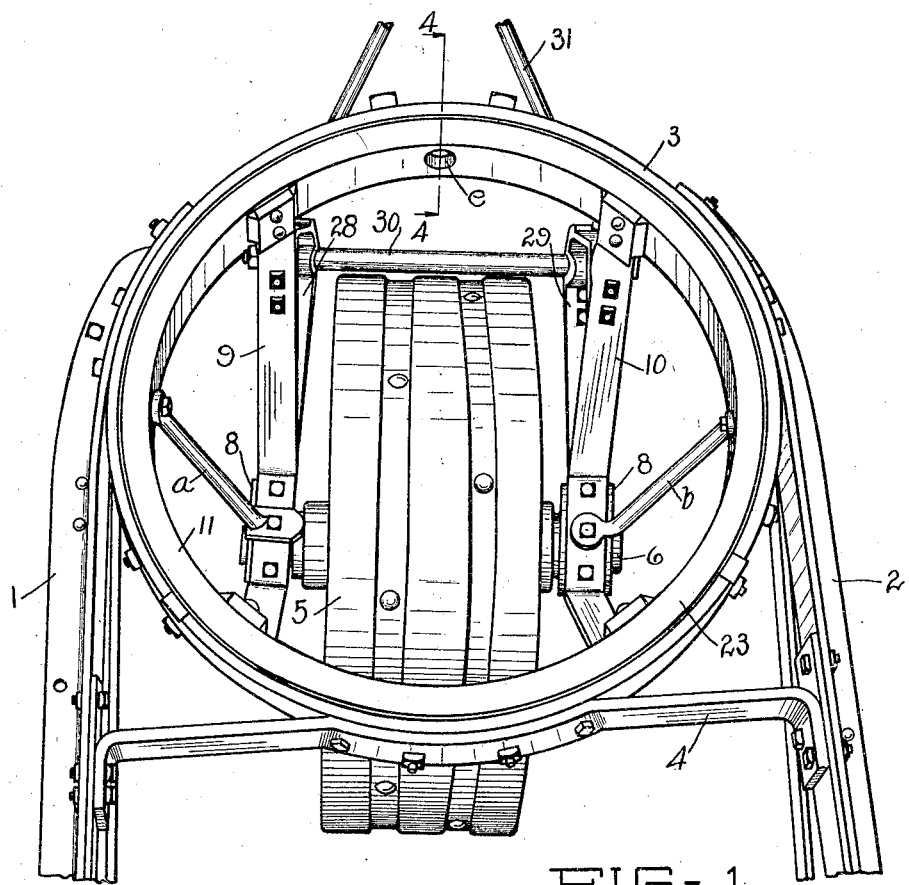
Figure 1 is a perspective view of the front of the wheel supported frame of a combined harvester and thresher showing the structure on which my device is used.

The forward part of the main frame is composed of side bars 1 and 2 rigidly bolted to a circular member 3 constructed of a flat steel bar. A brace 4 extends from one frame bar to the other and is securely bolted to both bars; the central part of the brace 4 is bent concentric with the circular member 3 and is bolted thereto. In this instance a single wheel 5 is employed mounted on an axle 6 journaled in bearings 7 and 8 secured respectively on V brackets 9 and 10. The legs of the brackets 9 and 10 extend upwardly and are bolted to a circular member 11. Braces $a$ and $b$ are secured respectively to the brackets 9 and 10 and extend upwardly to the member 11 to which they are firmly bolted.

The member 11 is formed of channel steel, is located within the member 3 and in the same horizontal plane with the channel disposed toward the member 3.

Figure 3:
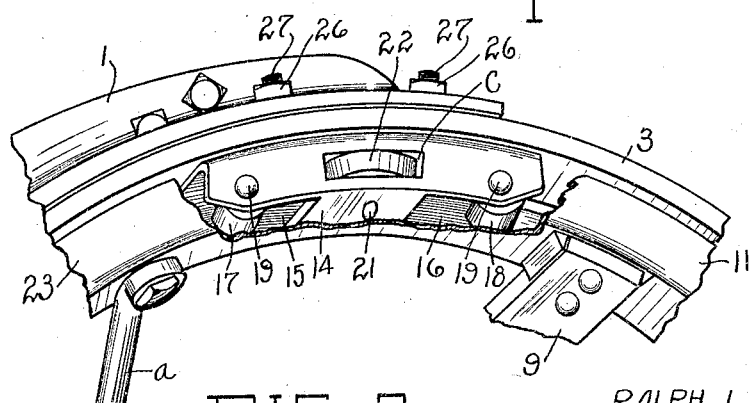
Figure 3 is an enlarged perspective view, in detail, of part of Figure 1 showing an anti-friction unit in place.

My invention, as previously stated, consists of anti-friction units, and I mount these units on the inner side of the member 3 so that they operate in the channel of the member 11. These units are spaced apart a sufficient distance to ensure a perfect ease of movement of the member 11 and a strong support for the forward part of the main frame. Each unit consists of a cage 14 preferably a casting, which has a central base portion curved concentric with the members 3 and 11 and secured to the member 3 by suitable bolts and is provided with flanges which form recesses 15 and 16 located respectively at the ends of the cage and separated by a central bridge or closure. Rollers 17 and 18 are mounted in said recesses and rotate freely on vertical spindles 19 secured in the top and bottom of the cage. The rollers 17 and 18 project beyond the inner face of the cage to contact with the wall 20 of the member 11, as clearly shown in Figures 2, 3, and 4.

Mounted on a horizontal spindle 21, journaled centrally in a suitable orifice in the front and rear of the cage 14 or the central base and bridge portions, is a roller 22 having its tread surface projecting through slots $c$ and $d$ in the top and bottom of the cage respectively and beveled for full contact with the inclined surface of either of the flanges 23 and 24 of the member 11 according to tilting movement of the member 11 that may be caused by conditions of the ground surface.

I have shown a plurality of my anti-friction units secured to the fixed member 3 and upon which the member 11 is rotatable. To mount the units I first place them loosely in the channel of the member 11, and as near as possible to the position they will occupy when secured to the member 3. I then turn the member 11 until an orifice $e$ therein is opposite one of the square holes 25 in the outside wall of the cage 14; by insertion of a suitable tool through the orifice $e$ and the hole 25, the member 11 and the unit are moved together until the hole 25 registers with a hole in the member 3. As soon as this alinement is accomplished I withdraw the tool and through the orifice e and the opposed holes in the outside wall of the cage and the member 3 I insert a carriage bolt 26 and draw it firmly in place by operation of a nut 27 on the outer side of the member 3. A further movement of the member 3 and the second bolt can be inserted and secured in a similar manner so as to rigidly secure the unit in place. All of the units are positioned and secured to the member 3 by a similar operation.

The machine, embodying my invention, is designed to be drawn by a tractor and is therefore provided with a hitch device consisting of parallel bars 28 and 29 extending forwardly and secured respectively, in any suitable manner, to the structure supporting the member 11. A bar 30 is mounted on the forward ends of the bars 28 and 29 and extends sufficiently therefrom to receive the eyed ends of a V-shaped hitch element 31 provided with an eye, at the apex thereof, by which it can be attached to a tractor. It is evident that when the tractor, to which the machine may be attached, changes the direction of travel the wheel will be steered accordingly, the member 11 rotating on the member 3 with an ease and minimum of friction resulting from the use of my anti-friction device as described and shown.

What I claim is—

1. In a steering mechanism for wheeled vehicles of the character stated, the combination of a frame, a circular member secured on the frame, a circular wheel supported member rotatable within the first member and having a peripheral channel disposed toward the first member, a plurality of anti-friction units operating between said members and each of said units consisting of a cage, a roller supported on a horizontal pivot in the cage and adapted to contact with either of the flanges of the channel, rollers mounted on vertical pivots in the cage and in contact with the web of the channel, and an opening in said web adapted for the passage of bolts to secure said cage to the first mentioned member.

2. In a steering mechanism for wheeled vehicles of the character stated, the combination of a frame, a circular member secured to the frame, and a circular wheel supported member disposed concentrically and rotatable with respect to the first member, one of said members having a peripheral channel disposed toward the other member and a plurality of anti-friction units operating between said members and secured to the other member, each of said units consisting of a cage having a central base portion, flanges extending laterally from the upper and lower edges of said central base portion, at least one roller journaled on a vertical pivot between said flanges and positioned to contact with the web of the channel, a bridge connecting said flanges, and a roller journaled on a horizontal pivot between said bridge and said central base portion, the latter roller being positioned to contact with one of the flanges of said channel.

In witness whereof, I hereunto subscribe my name this 22nd day of September, 1930.

RALPH L. ANDERSON.